United States Patent
Schmidt et al.

(10) Patent No.: US 10,900,799 B2
(45) Date of Patent: Jan. 26, 2021

(54) SYSTEMS AND METHODS FOR DETERMINING A DESTINATION LOCATION FROM A COMMUNICATION

(75) Inventors: Eric Randell Schmidt, Northville, MI (US); Jeffrey Edward Pierfelice, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1980 days.

(21) Appl. No.: 12/902,406

(22) Filed: Oct. 12, 2010

(65) Prior Publication Data
US 2012/0089331 A1  Apr. 12, 2012

(51) Int. Cl.
*G01C 21/36* (2006.01)

(52) U.S. Cl.
CPC .................................. *G01C 21/362* (2013.01)

(58) Field of Classification Search
CPC .................................................... G01C 21/362
USPC ................................................. 701/437, 445
See application file for complete search history.

(56) References Cited

U.S. PATENT DOCUMENTS

| | | |
|---|---|---|
| 6,112,153 A | 8/2000 | Schaaf et al. |
| 6,999,754 B2 | 2/2006 | Hashimoto et al. |
| 7,085,629 B1 | 8/2006 | Gotou et al. |
| 7,646,296 B2 | 1/2010 | Ohki |
| 2002/0156830 A1* | 10/2002 | Gayama ................. G01C 21/26 709/201 |
| 2004/0054469 A1 | 3/2004 | Rentel |
| 2005/0222754 A1 | 10/2005 | Meisler et al. |
| 2005/0246095 A1 | 11/2005 | Banet et al. |
| 2006/0068808 A1 | 3/2006 | Karavias |
| 2006/0287811 A1 | 12/2006 | Rentel |
| 2008/0036586 A1* | 2/2008 | Ohki .................... G01C 21/362 340/539.13 |
| 2008/0233981 A1 | 9/2008 | Ismail |
| 2009/0164110 A1* | 6/2009 | Basir .................... G01C 21/362 701/117 |
| 2010/0131191 A1 | 5/2010 | Ohki |
| 2010/0153855 A1* | 6/2010 | Roberts ................ G06Q 10/107 715/752 |
| 2010/0287024 A1* | 11/2010 | Ward et al. ....................... 705/9 |
| 2011/0106892 A1* | 5/2011 | Nelson ................. G06Q 10/109 709/206 |
| 2011/0145822 A1* | 6/2011 | Rowe et al. ................... 718/100 |

* cited by examiner

*Primary Examiner* — Imran K Mustafa
(74) *Attorney, Agent, or Firm* — Dinsmore & Shohl LLP (57) ABSTRACT

Systems and methods for determining a destination location from a communication are described. One embodiment of a method includes receiving electronic communications data from a mobile communications device, at a computing device. The electronic communications data is parsed to identify a partial address term of interest related to the destination location in the electronic communications data. A position of the destination location is determined from the partial address term of interest. Routing data of a vehicle from a current location of the vehicle to the destination location is determined and provided to a user of the vehicle.

20 Claims, 10 Drawing Sheets

FIG. 11

SYSTEMS AND METHODS FOR DETERMINING A DESTINATION LOCATION FROM A COMMUNICATION

TECHNICAL FIELD

Embodiments described herein generally relate to determining a destination location from a communication and, more specifically, to utilizing data from an electronic communication to determine an address and/or directions for a location identification and navigation systems utilizing the same.

BACKGROUND

Electronic communications, such as mobile telephone calls, text messages, email, video chat, and the like, are prevalent and often include communications regarding a physical location. More specifically, oftentimes parties to an electronic communication decide to meet at a predetermined destination location. However, upon determination of the destination location, one of the parties may not know the address or geographic position of the destination location, and thus, may not know directions to the destination location from their present position. Consequently, that party may be forced to manually lookup data regarding the destination location, as well as look up directions.

SUMMARY

Included are embodiments for determining a destination location from a communication. One embodiment of a method includes receiving, at a computing device, electronic communications data from a mobile communications device, parsing the electronic communications data to identify a partial address term of interest and/or a non-address term of interest related to the destination location in the electronic communications data and determining, from the partial address term of interest, a position of the destination location. Similarly, some embodiments include determining routing data of a vehicle from a current location of the vehicle to the destination location; and providing the routing data to a user of the vehicle.

In another embodiment, a system includes a memory component that stores location identification logic that is configured to cause the system to receive an electronic transcript of the communication from a mobile communications device and parse the electronic transcript to identify a first non-address term of interest related to the destination location in the electronic transcript. Similarly some embodiments the location identification logic is configured to determine a position of the destination location, from the first non-address term of interest, determine routing data for a vehicle from a current location to the destination location, and provide the routing data to a user of the vehicle.

In yet another embodiment, a non-transitory computer-readable medium includes a program that, when executed by a computer, causes the computer to receive electronic communications data from a mobile communications device, parse the electronic communications data to identify a first partial address term of interest related to the destination location in the electronic communications data, and determine, from the first partial address term of interest, a position of the destination location. In some embodiments, the program is configured to determine routing data for a vehicle from a current location to the destination location and provide the routing data to a user of the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems, methods, and non-transitory computer-readable mediums for providing navigation services to a destination location as determined from an electronic communication. More specifically, in at least one embodiment, a vehicle may include a location identification and navigation system that is configured to communicate with a mobile communication device. A user may receive an electronic message (such as a text message) from a third party on the mobile communication device. The mobile communications device may send data related to that text message to the location identification and navigation system. The location identification and navigation system can receive the data, parse the data, and determine whether the data identifies a destination location. If so, the location identification and navigation system can determine a global position of the destination location and provide navigation services to the vehicle to reach the destination location.

Figure 1:
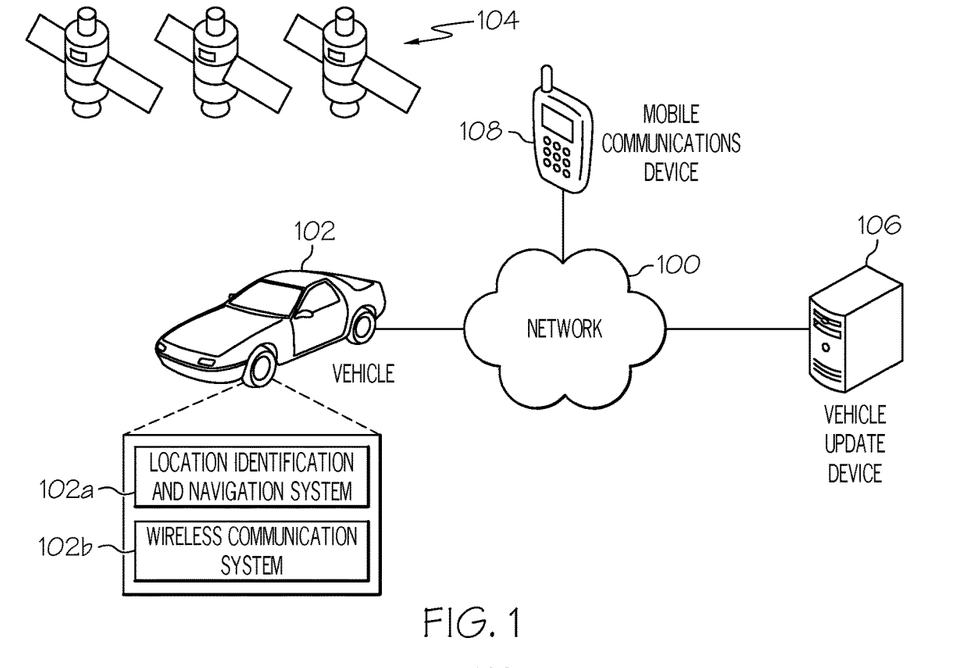
FIG. 1 schematically depicts a communications network, illustrating various components that may be utilized in a system for determining a destination location from a communication, according to embodiments disclosed herein.

Referring now to the drawings, FIG. 1 depicts a communications environment illustrating components that may be utilized in a system for determining a location from a communication, according to embodiments disclosed herein. In one embodiment, the communications environment of FIG. 1 includes a network 100 that is coupled to a vehicle 102, a mobile communications device 108, and a vehicle update device 106. As illustrated in FIG. 1, a computer network 100 may include a wide area network, such as the internet, a local area network (LAN), a mobile communications network, a public service telephone network (PSTN), a satellite network, a Bluetooth® network and/or other suitable networks. The network 100 may be configured to facilitate electronic communications among a vehicle 102, a vehicle update computing device 106, and a mobile communications device 108.

As described in more detail below, the vehicle 102 includes a location identification and navigation system 102a configured to provide navigation services (such as routing) to the vehicle 102 through the use of one or more satellites 104. The location identification and navigation system 102a may also be configured to provide a graphical user interface, as well as receive user input related to a destination location and determine directions for reaching the destination location.

Additionally, the vehicle 102 may include a wireless communications system 102b for facilitating communications with the mobile communications device 108. The wireless communications system 102b may be configured to communicate with the mobile communications device 108 via Bluetooth® and/or other wired or wireless communications protocols. More specifically, in some embodiments, the wireless communications system 102b can facilitate hands-free voice communications with the mobile communications device 108, receive commands from the mobile communications device 108, communicate textual messages (such as emails, instant messages short message service messages, and the like) with the mobile communications device, receive voice commands for controlling various systems of the vehicle 102 and/or provide other services. For example, if the user is in textual communication with a third party while driving, the user may employ the wireless communication system 102b to facilitate a voice-to-text conversion.

The network of FIG. 1 also includes a vehicle update computing device 106 for providing updates to the location identification and navigation system 102a and/or the wireless communications system 102b. Additionally, depending on the particular embodiment, the vehicle update computing device 106 may include logic to assist in the routing instructions provided by the location identification and navigation system 102a and/or the communications provided by the wireless communications system 102b.

In some embodiments, the user can receive a text message on the mobile communications device 108. The mobile communications device 108 can then utilize the wireless communications system 102b to send the text message to the location identification and navigation system 102a. The location identification and navigation system 102a can determine whether the text message includes any data associated with a destination location. If so, the location identification and navigation system 102a can determine a global position of the destination location. The location identification and navigation system 102a can then determine navigational routing for directing the vehicle 102 to the destination location. Other embodiments are described below.

It should be understood that, while the vehicle 102 is depicted as a car, this is merely an example. More specifically, in some embodiments, any type of vehicle may be utilized, including cars, trucks, motorcycles, busses, boats, airplanes, helicopters, and/or other vehicles. Similarly, the vehicle update computing device 106 may be implemented as a personal computer, mobile computing device, server, or the like). Further, while the mobile communications device 108 is depicted as a smart phone, the mobile communications device 108 may be embodied as any device configured for facilitating communications, such as mobile telephones, smart phones, personal computers, or the like. Similarly, while the vehicle update device 106 is embodied as a server in FIG. 1, it should be understood that any computing device may be utilized. Additionally, while each of these components is illustrated in FIG. 1 as a single piece of hardware, this is also just an example. More specifically, each of the vehicle 102, vehicle update computing device 106, and mobile communications device 108 may each represent a plurality of computers, servers, databases, and the like. Further, while the mobile communications device is illustrated in FIG. 1 as a separate device 108 from the vehicle 102, this is also an example. In some embodiments, the mobile communications device 108 may be integrated into the vehicle as a single unit.

Figure 2:
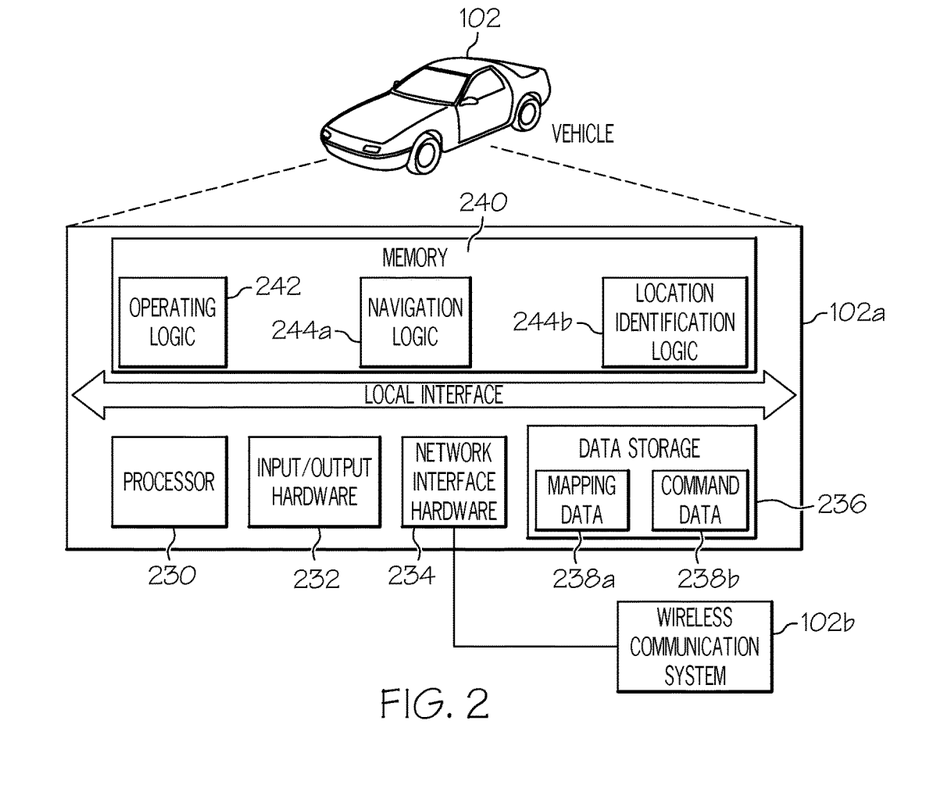
FIG. 2 schematically depicts a computing environment that may be utilized in a vehicle for implementing a system for determining a destination location from a communication, according to embodiments disclosed herein.

Referring to FIG. 2, a computing environment is depicted that may be utilized by the vehicle 102 for implementing navigation services, according to embodiments disclosed herein. As illustrated, the vehicle 102 may include the location identification and navigation system 102a, which may include a processor 230, input/output hardware 232, network interface hardware 234, a data storage component 236 (which stores mapping data 238a and command data 238b), and a memory component 240. The memory component 240 may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, these non-transitory computer-readable mediums may reside within the location identification and navigation system 102a and/or external to the location identification and navigation system 102a.

Additionally, the memory component 240 may be configured to store operating logic 242, navigation logic 244a, and location identification logic 244b, each of which may be embodied as a computer program, firmware, and/or hardware, as an example. A local interface 246 is also included in FIG. 2 and may be implemented as a bus or other interface to facilitate communication among the components of the vehicle 102.

The processor 230 may include any processing component configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices. As illustrated, the network interface hardware 234 may be coupled to the wireless communications system 102*b*. From this connection, communication may be facilitated between the location identification and navigation system 102 and the wireless communications system 102*b*.

Similarly, it should be understood that the data storage component 236 may reside local to and/or remote from the vehicle 102 and may be configured to store one or more pieces of data for access by the vehicle 102 and/or other components. As illustrated in FIG. 2, the data storage component 236 stores mapping data 238*a*, which in some embodiments includes data related to roads and road positions, as well as routing algorithms for routing the vehicle 102 to a desired destination location. Also stored in the data storage component 236 is command data 238*b*. Command data 238*b* may include information related to user commands for the wireless communications system 102*b*, and/or data and algorithms for the location identification and navigation system 102*a*. More specifically, the command data may include algorithms for parsing a textual communication, algorithms for determining an identifier for a destination location from a parsed message, algorithms for converting a voice conversation into an electronic transcript, data related to common words used to identify a destination location, and/or other algorithms and data.

Included in the memory component 240 are the operating logic 242, the navigation logic 244*a*, and the location identification logic 244*b*. The operating logic 242 may include an operating system and/or other software for managing components of the vehicle 102. Similarly, the navigation logic 244*a* may reside in the memory component 240 and may be configured to facilitate routing of the vehicle 102 from a current location to a destination location.

Similarly, the location identification and navigation system 102*a* (via the location identification logic 244*a*) may be configured to receive communication data from the wireless communications system 102*b* and determine, from the communication data, a destination location. As discussed in more detail below, the wireless communications system 102*b* can receive an electronic transcript (or other data) from the mobile communications device 108. The wireless communications system 102*b* can communicate the data to the location identification and navigation system 102*b* (via the location identification logic 244*b*), which can parse the received data and determine a destination location that was referenced in the communication. Additionally, the location identification logic 244*b* can be executed in conjunction with the navigation logic 244*a* to determine a routing from the current vehicle position to the referenced destination location.

It should be understood that the components illustrated in FIG. 2 are merely exemplary and are not intended to limit the scope of this disclosure. More specifically, while the components in FIG. 2 are illustrated as residing within the vehicle 102, this is a nonlimiting example. In some embodiments, one or more of the components may reside external to the vehicle 102 (such as on the vehicle update computing device 106). For example, in some embodiments the mobile communications device 108 may include a location identification and navigation system that may allow the mobile communications device to perform all the functionality described herein, without utilization of the vehicle 102. Similarly, while FIG. 2 is directed to the vehicle 102, other components such as the vehicle 102 and the mobile communications device 108 may include similar hardware, software, and/or firmware.

It should also be understood that while the location identification and navigation system 102*a* in FIGS. 1 and 2 is illustrated as a single system, this is also merely an example. More specifically, in some embodiments, the navigation system functionality is implemented separately from the location identification functionality, which may be implemented with separate hardware, similar to that illustrated in FIG. 2.

Figure 3:
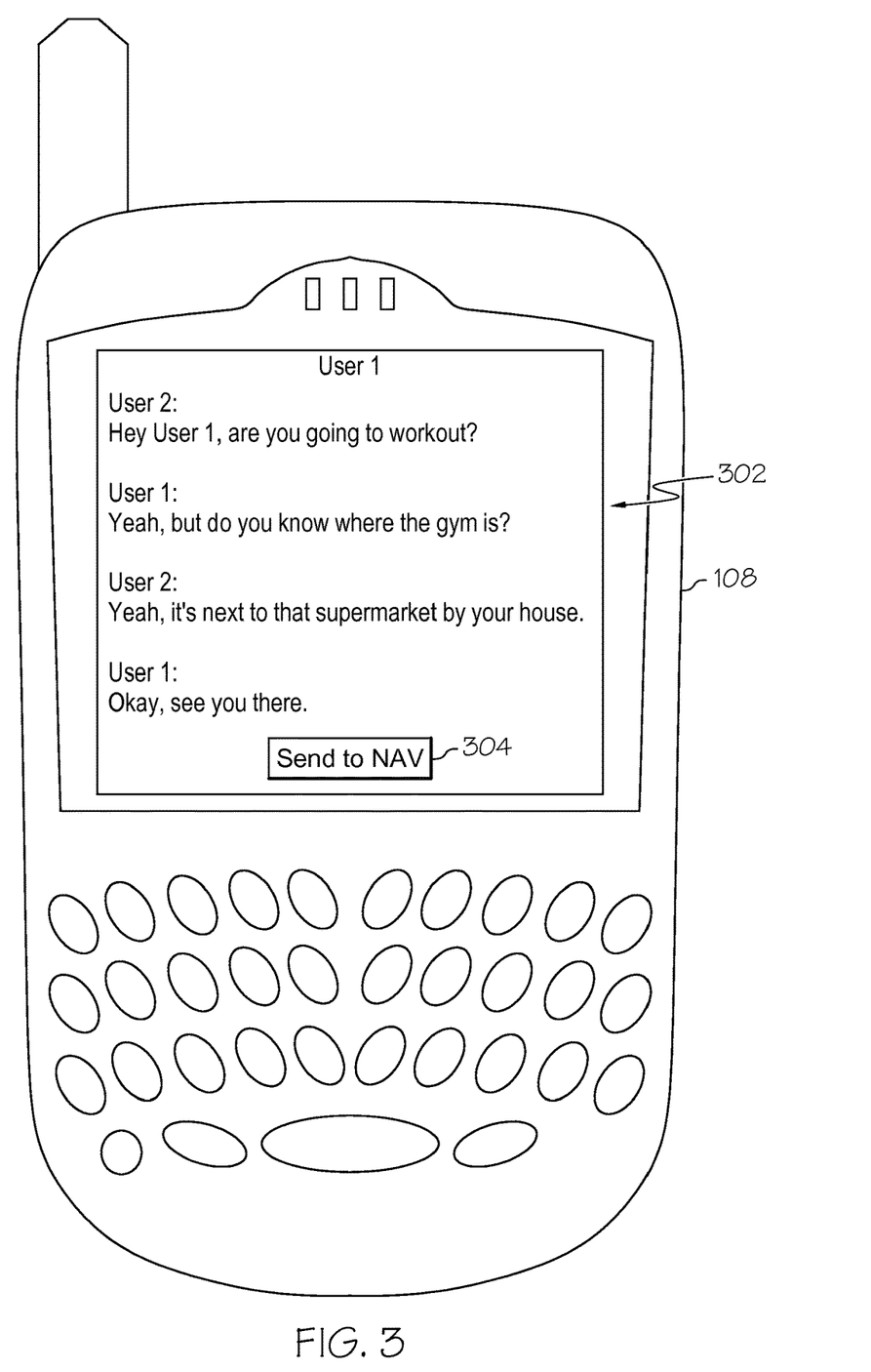
FIG. 3 schematically depicts a mobile communications device configured to interface with a vehicle and provide communications services, according to various embodiments disclosed herein.

FIG. 3 depicts a mobile communications device 108 that may be configured to interface with the vehicle 102 for providing communications services, according to various embodiments disclosed herein. As illustrated in FIG. 3, the mobile communications device 108 may be configured to facilitate textual, voice, and/or video communications and may present an electronic transcript of those communications in a display interface 302. For textual communications, such as text (SMS) messages and emails, the electronic transcripts may be automatically displayed as part of the messaging protocol. Additionally, the mobile communications device may include a user option user 304 for sending data related to the communication to the location identification and navigation system 102*a*. Accordingly, in some embodiments, selection of the option 304 may send the electronic transcript to the location identification and navigation system 102*a*. However, in some embodiments, the location identification and navigation system 102*a* may be configured to receive the electronic transcript in real-time automatically (or in response to a user selection of the user option 304).

Similarly, in some embodiments, the mobile communications device 108 may be configured with logic similar to location identification logic 244*b* (FIG. 2) that can facilitate parsing of the electronic transcript to determine a possible destination location being described in the communication. In these embodiments, the mobile communications device 108 may forward the identified location to the location identification and navigation system 102*a* for determination of a routing to the destination location.

Regardless of whether the mobile communications device 108 or the location identification and navigation system 102*a* parses the electronic transcript, an identification of words and/or phrases in the electronic transcript that refer to a destination location may be performed. In the example of FIG. 3, the terms "workout" and "gym" are used and may thus be identified as indicative of a destination location. From this identification, the location identification and navigation system 102*a* (via the location identification logic 244*b*) may facilitate a determination that that the communication is related to a fitness center, gym, or other type of similar facility. Further, the terms "supermarket by your house" can identify that a destination location of a gym or fitness center is within a certain distance of User 1's house. With knowledge of the location of the user's house, the location identification and navigation system 102*a* can identify the desired destination location. Further narrowing may be performed by identifying fitness centers and/or gyms with a similar address of a supermarket close to User 1's house. Once the destination location is identified, the location identification and navigation system 102*a* can determine an address and/or global position of the destination location. The location identification and navigation system 102a can additionally provide directions and/or other navigation services to the determined destination location.

Figure 4:
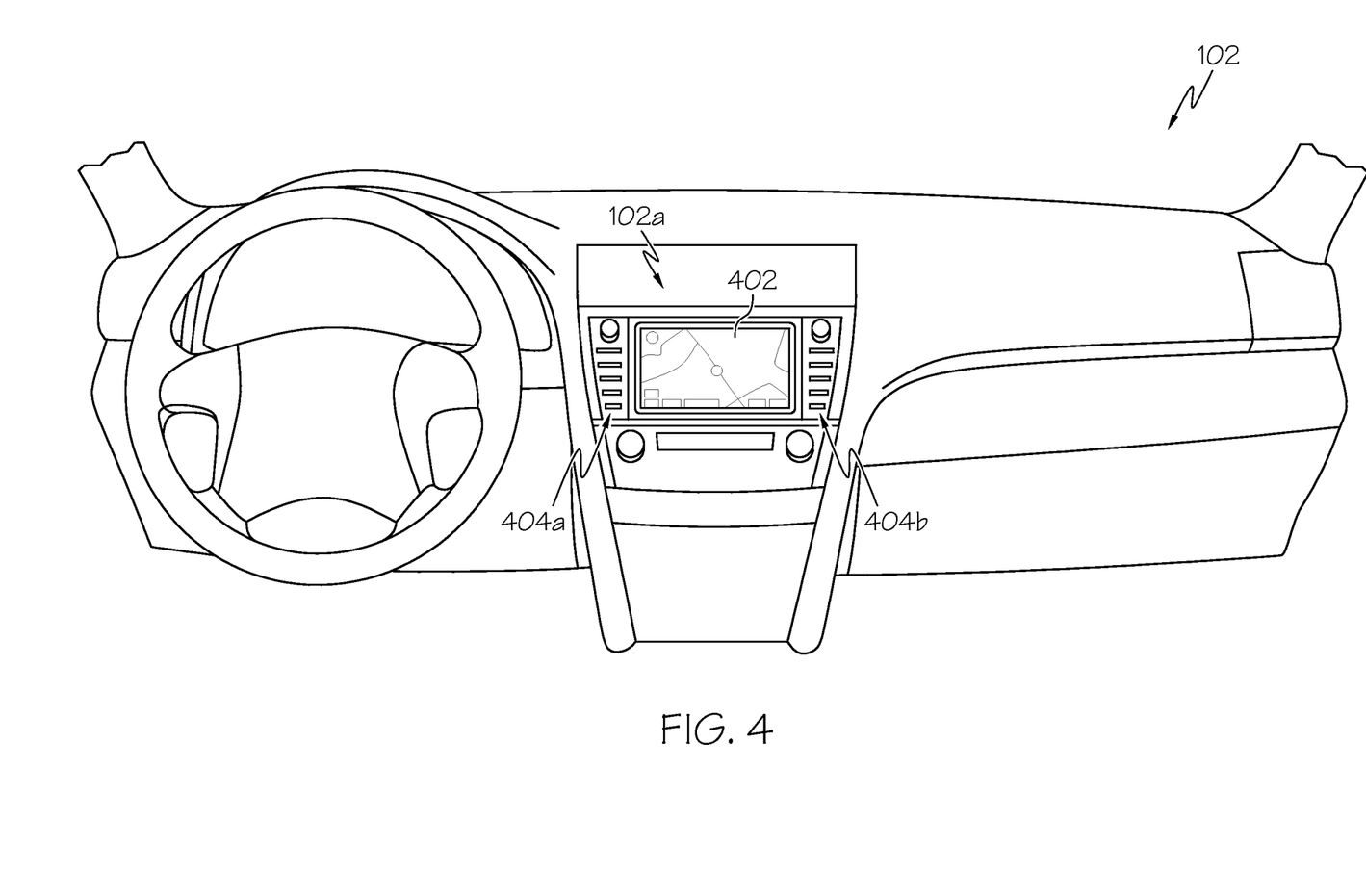
FIG. 4 depicts an interior of a vehicle, illustrating a location identification and navigation system, according to embodiments disclosed herein.

FIG. 4 depicts an interior of the vehicle 102, illustrating the location identification and navigation system 102a, according to embodiments disclosed herein. As illustrated in FIG. 4, the location identification and navigation system 102a may include a display device 402. The display device 402 may be configured with a touch screen for receiving user input and/or may include one or more other user input devices 404a, 404b. While embodiments disclosed herein refer to utilization of a touch screen, these are merely examples, as other types of input devices may be employed.

Figure 5:
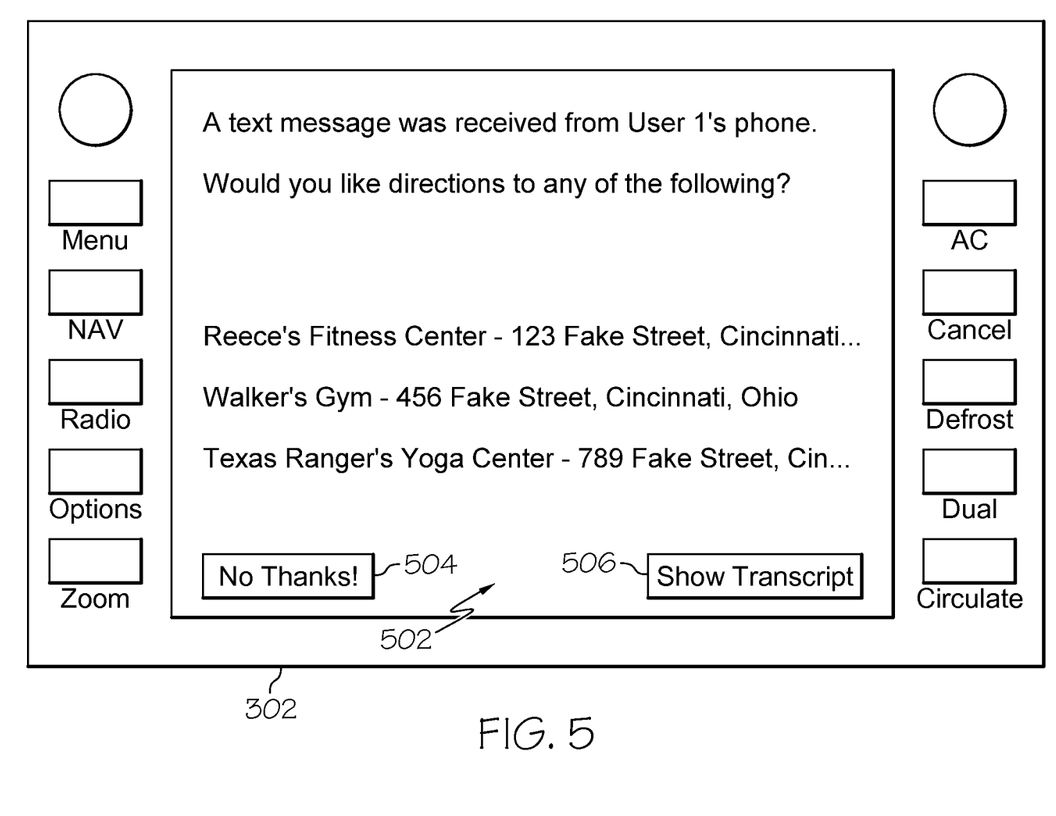
FIG. 5 depicts a screenshot from a location identification and navigation system, illustrating a determination of location received from a text message, according to embodiments disclosed herein.

FIG. 5 depicts a screenshot 502 from the display device 402 of the location identification and navigation system 102a, illustrating a determination of destination location received from a textual message, according to embodiments disclosed herein. As discussed above, upon selection of the user option 304 in FIG. 3 (and/or automatically, depending on the embodiment), an electronic transcript and/or other data related to the communication can be sent to the location identification and navigation system 102a. Accordingly, a determination can be made regarding the destination location described in the communication. If there is a plurality of possible destination locations determined from the electronic transcript, a list of the possible destination locations may be provided in the screenshot 502. The user can select one of the destination locations by touching the touch screen on that destination location and, in response, the location identification and navigation system 102a can route the vehicle 102 from the current location to the selected destination location. Additionally, if navigation services are not desired, the user can select a "no thanks" option 504. If the user wishes to see an electronic transcript of the communication, the user can select a "show transcript" option 506.

Figure 6:
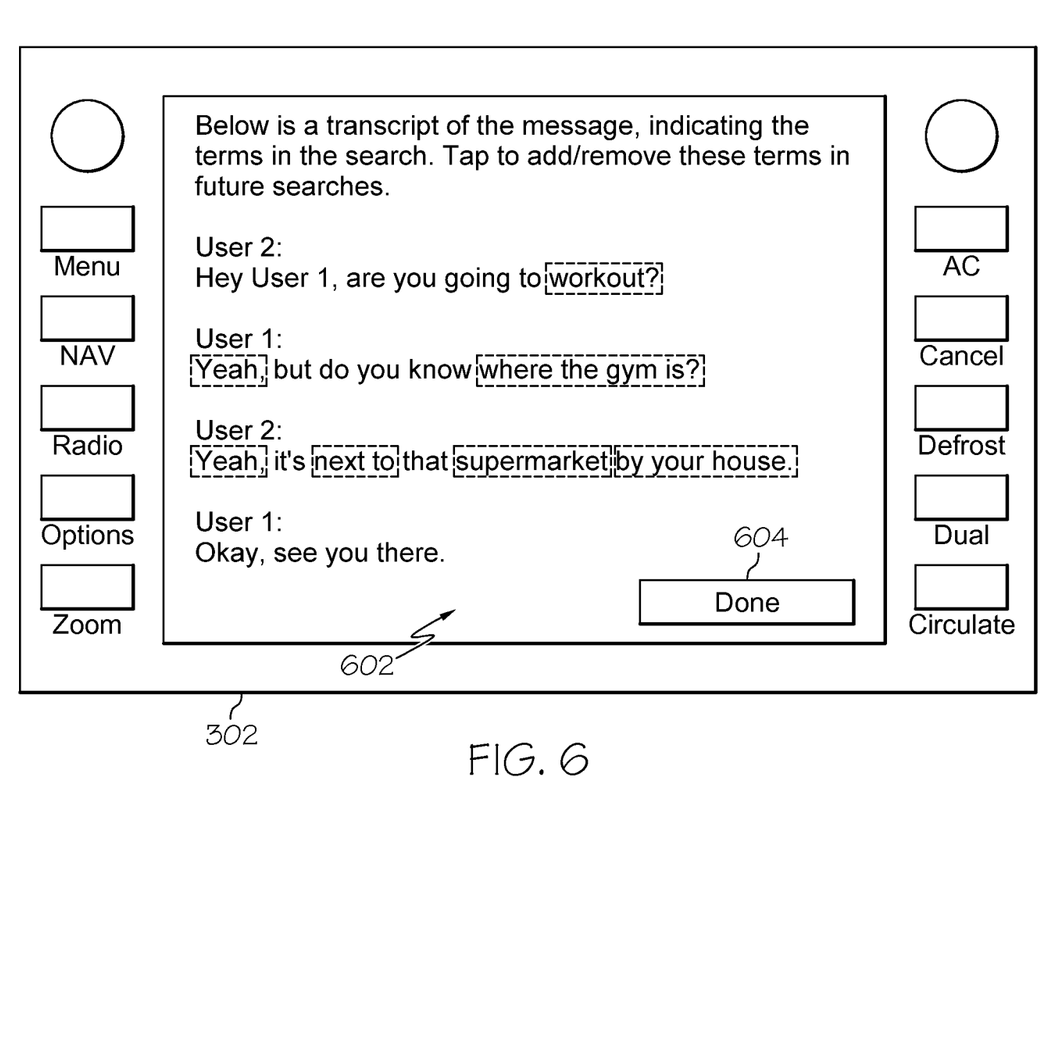
FIG. 6 depicts a screenshot from a location identification and navigation system, illustrating an electronic transcript of a text message received from a mobile communications device, according to various embodiments disclosed herein.

FIG. 6 depicts a screenshot 602 from the display device 402 of the location identification and navigation system 102a, illustrating an electronic transcript of a text message received from a mobile communications device 108, according to various embodiments disclosed herein. As illustrated, the electronic transcript from FIG. 3 is provided, with terms of interest being identified. More specifically, the location identification and navigation system 102a may be configured to identify possible terms that refer to a destination location. As illustrated, the a first term of interest may include the term "workout," while a second term of interest may include the term "yeah." Similarly, other terms of interest illustrated in FIG. 6 include "where the gym is," "yeah," "next to," "supermarket," and "by your house," each of which has been identified by the location identification and navigation system 102a.

As illustrated, the terms of interest may comprise a partial address and/or non-address for the destination location. More specifically, while no actual address is provided in the message of FIG. 6, an address (or global position) of the destination location may be determined from geographic and other descriptions parsed from the electronic transcript. While some electronic transcripts may include a partial address (such as the phrase "that fitness center on Fake Street"), in some embodiments (such as in FIG. 6), the terms of interest may include no portion of an actual street address, street name, street number, or other data from an address. Consequently, embodiments of the location identification and navigation system 102a may be configured to determine an address or global position of the destination location using only non-address terms of interest (such as "by your house").

Further, the presence and location of these terms of interest in the electronic transcript may assist the location identification and navigation system 102a in selecting the possible destination locations provided in the screenshot 502 from FIG. 5. Additionally, if a user feels that other terms from the electronic transcript should have been utilized or that some of the identified terms should be removed, the user can select those terms and the determination of the destination location may be updated. The user may exit by selecting a "done" option 604.

Figure 7:
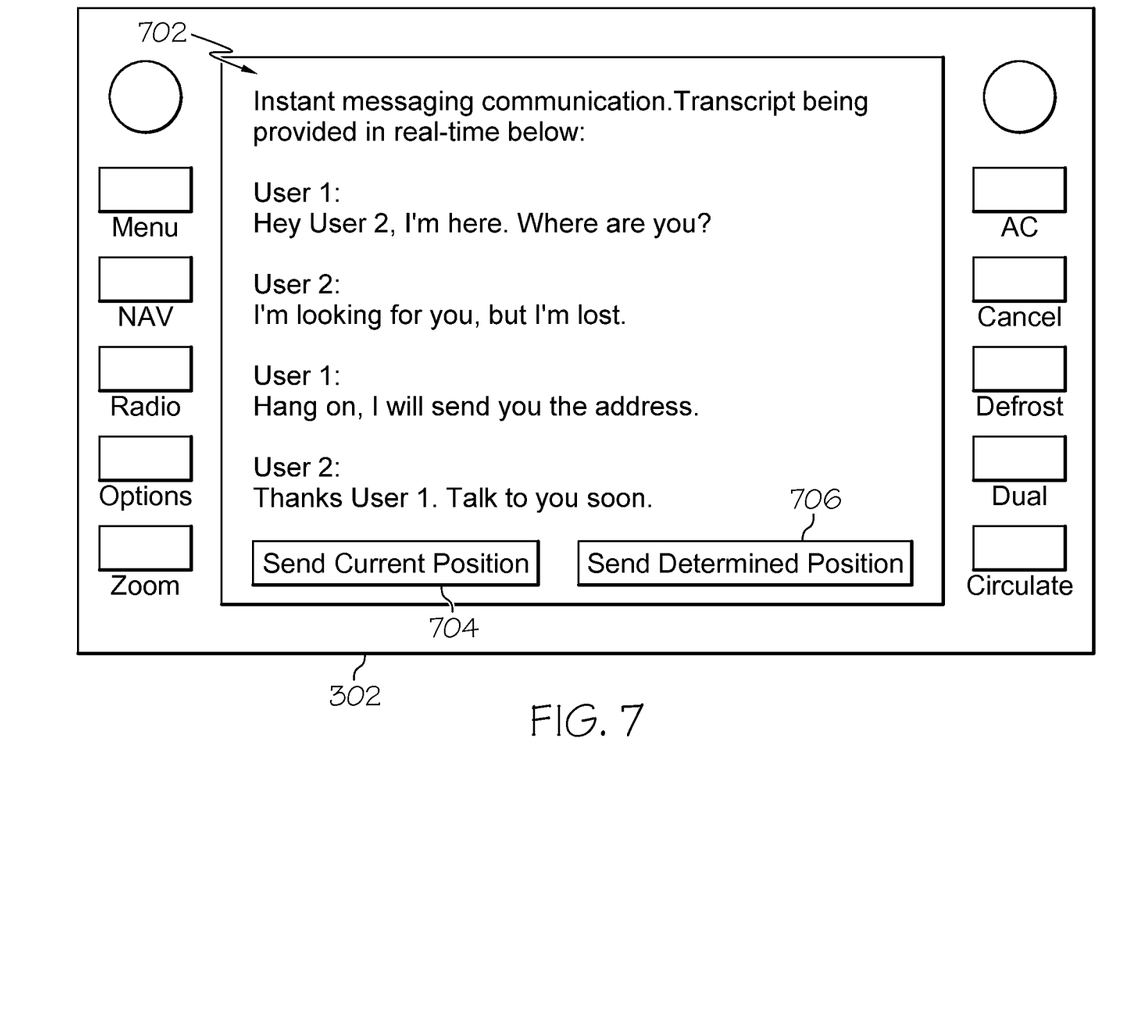
FIG. 7 depicts a screenshot from a location identification and navigation system, illustrating a real-time electronic transcript of a real-time communication over a mobile communications device, according to embodiments disclosed herein.

FIG. 7 depicts a screenshot 702 from the display device 402 of the location identification and navigation system 102a, illustrating a real-time electronic transcript of a communication over the mobile communications device 108, according to embodiments disclosed herein. As illustrated, User 1 is now in an instant messaging session with User 2 (via a third party mobile communications device) with the mobile communications device 108. In one embodiment, the wireless communications system 102b may be configured to facilitate a wireless communication with the mobile communications device 108 to provide hands-free communication voice-to-text capabilities, such as through a speaker system in the vehicle 102. As described below, this real time communication may be provided automatically or in response to selection of the user option 304, from FIG. 3.

Regardless, in the communication illustrated in the screenshot 702, User 1 is present at the destination location and is looking for User 2. User 2 indicates that he is lost. From this electronic transcript, the location identification and navigation system 102a can determine that User 2 might need navigation services. Accordingly, the location identification and navigation system 102a may provide a "send current location" option 704 and a "send determined position" option 706. More specifically, by selecting the send current location option 704, the location identification and navigation system can send an address and/or routing data for the vehicle's current location to the mobile device User 2 is using. Similarly, by selecting the send determined position 706, User 1 may send User 2 an address and/or directions to the destination location that was determined in FIG. 5. Regardless, the address and/or routing data may be sent from the location identification and navigation system 102a to the wireless communications system 102b for transmission by the mobile communications device 108 to User 2.

It should be understood that while some embodiments may determine that User 2 needs navigation services and, in response, provide the send current location option 704 and/or the send determined position option 706, this is merely an example. More specifically, in some embodiments, either or both of these options may be automatically provided, once the destination location is determined.

Figure 8:
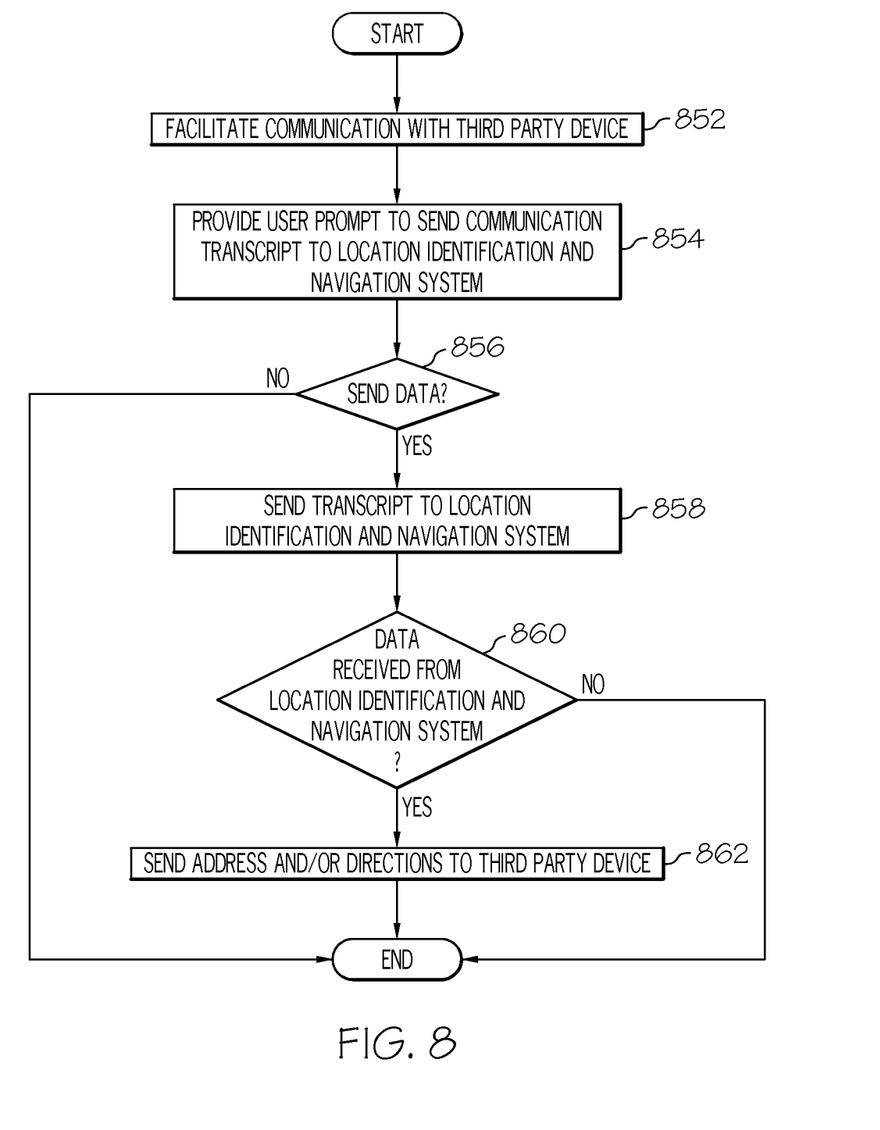
FIG. 8 depicts a flow diagram of a process for providing navigation services, as determined from an electronic communication, which may be utilized in a method for determining a location from a communication, according to embodiments disclosed herein.

FIG. 8 depicts a flow diagram of a process for providing navigation services to a destination location, which may be utilized in a method for determining a destination location from a communication, according to embodiments disclosed herein. As illustrated, the mobile communications device 108 can facilitate a communication with a third party device (block 852). The mobile communications device 108 can provide a user prompt to send an electronic transcript to the location identification and navigation system 102a (block 854). A determination can then be made regarding whether the user prompt was selected to authorize sending the data (block 856). If the user prompt is not selected, the process ends. If the data is authorized to be sent, an electronic transcript of the communication is sent to the location identification and navigation system 102*a* (block 858). The location identification and navigation system 102*a* can parse the transcript for terms of interest. A determination can then be made by the mobile communications device 108 regarding whether navigation data was received from the location identification and navigation system 102*a* (block 860). If the navigation data is not sent, the process ends. If so however, an address and/or directions can be sent from the mobile communications device 108 to the third party device (block 862).

Figure 9:
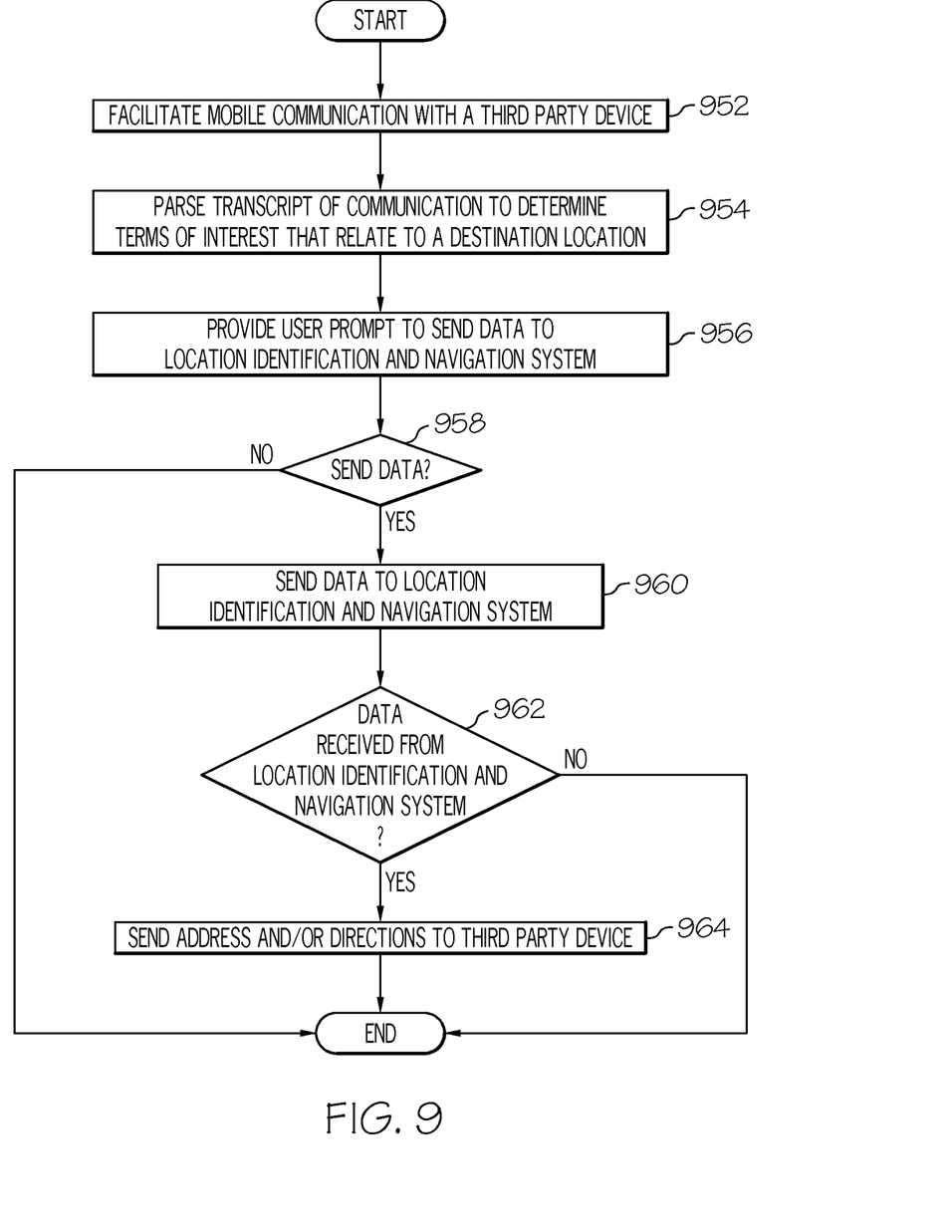
FIG. 9 depicts a flow diagram of a process for a mobile device to parse an electronic communication in determining an address and/or directions to a destination location, as may be utilized in a method for determining a location from a communication, according to embodiments disclosed herein.

FIG. 9 depicts a process for the mobile communications device 108 to parse an electronic communication, as may be utilized in a method for determining a destination location from a communication, according to embodiments disclosed herein. As illustrated, the mobile communications device 108 can facilitate a communication with a third party device (block 952). The mobile communications device 108 can parse an electronic transcript of the communication to determine a term ore terms of interest that relates to a destination location (block 954). Additionally, the mobile communications device 108 can provide a user prompt to send the parsed data, address data, and/or global position data to the location identification and navigation system 102*a* (block 956). A determination can be made regarding whether the user prompt was selected, authorizing sending of the data to the location identification and navigation system 102*a* (block 958). If the user prompt was not selected, the process may end. If however, the data is to be sent, the mobile communications device 108 can send the data to the location identification and navigation system 102*a* for determining the destination location (block 960). The mobile communications device 108 may also determine whether navigation data was received form the location identification and navigation system 102*a* (block 962). If not, the process can end. If navigation data has been received, the mobile communications device 108 can send the navigation data (e.g., an address and/or directions of the destination location) to the third party device (block 964).

Figure 10:
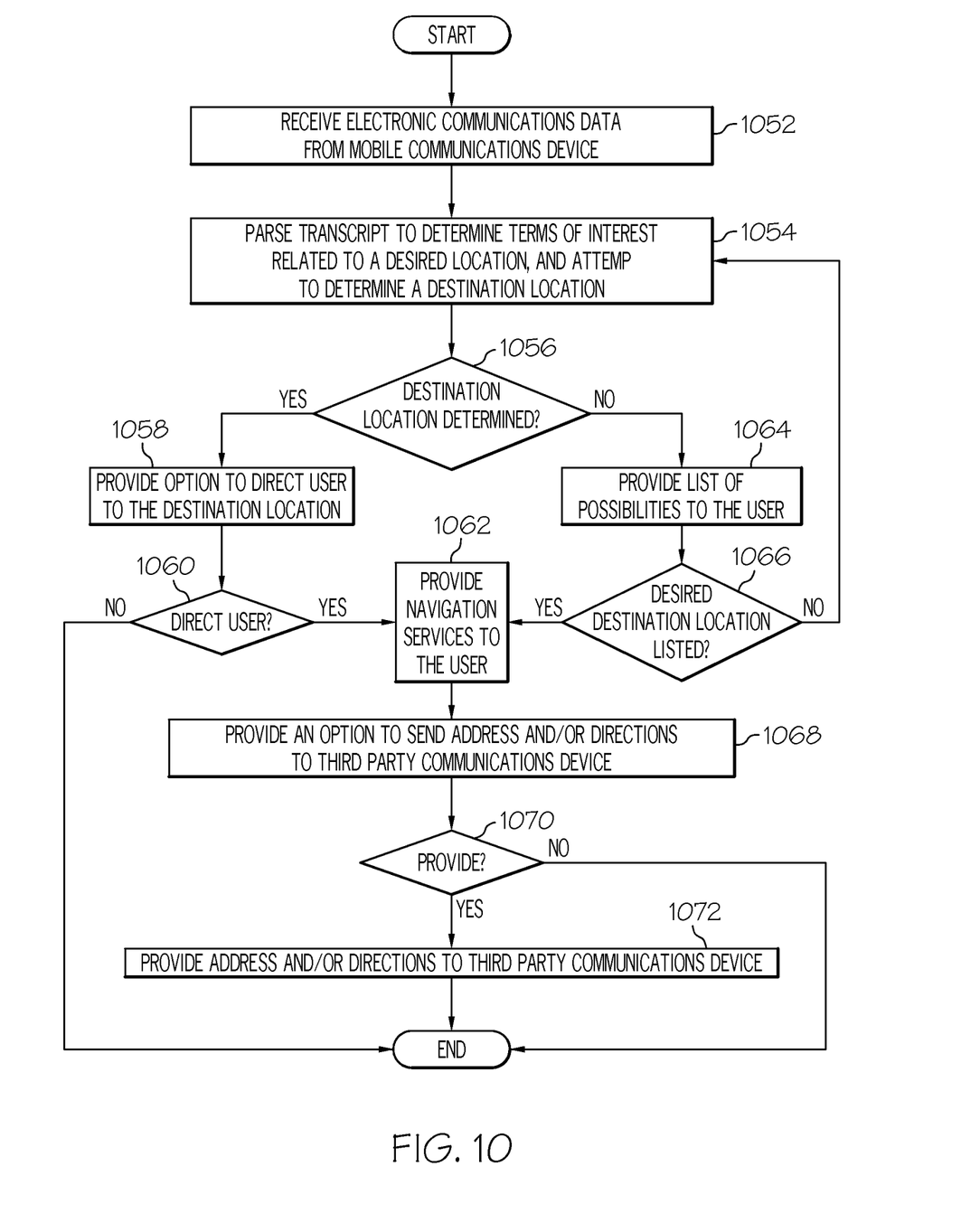
FIG. 10 depicts a flow diagram of a process for providing navigation services to a third party, which may be utilized in a method for determining a location from a communication, according to embodiments disclosed herein.

FIG. 10 depicts a process for providing navigation services to a third party device, which may be utilized in a method for determining a destination location from a communication, according to embodiments disclosed herein. As illustrated, the location identification and navigation system 102*a* can receive electronic communications data of a communication between the mobile communications device 108 and a third party communications device. The electronic communications data may include an electronic transcript from a mobile communications device 108 (block 1052). The location identification and navigation system 102*a* can parse the electronic communications data to determine terms of interest related to a destination location as well as attempt to determine a destination location (block 1054). If, at block 1056, a destination location is determined, the location identification and navigation system 102*a* can provide an option to direct the user to the destination location (block 1058). A determination can be made regarding whether the user selected the option and thus whether to direct the user to the destination location (block 1060). If not, the process can end. If so however, the location identification and navigation system 102*a* can provide navigation services to the user (block 1062).

Returning to block 1056, if a specific destination location is not determined, a list of possible destination locations can be provided to the user (block 1064). A determination can then be made regarding whether the desired destination location is listed (block 1066). If not, the process can return to block 1054 to continue to parse the electronic transcript. If the desired destination location is listed, navigation services can be provided to the user for the desired destination location (block 1062). The location identification and navigation system 102*a* can then provide an option to send the address and/or directions of the desired destination location to the mobile communications device 108 (block 1068).

A determination can also be made regarding whether to provide the address and/or direction of the destination location to the third party communications device (block 1070). If not, the process ends. However, if the user selects the option authorizing providing the data to the third party communications device, the address and/or directions to the destination location can in fact be provided to the third party communications device (block 1072).

Figure 11:
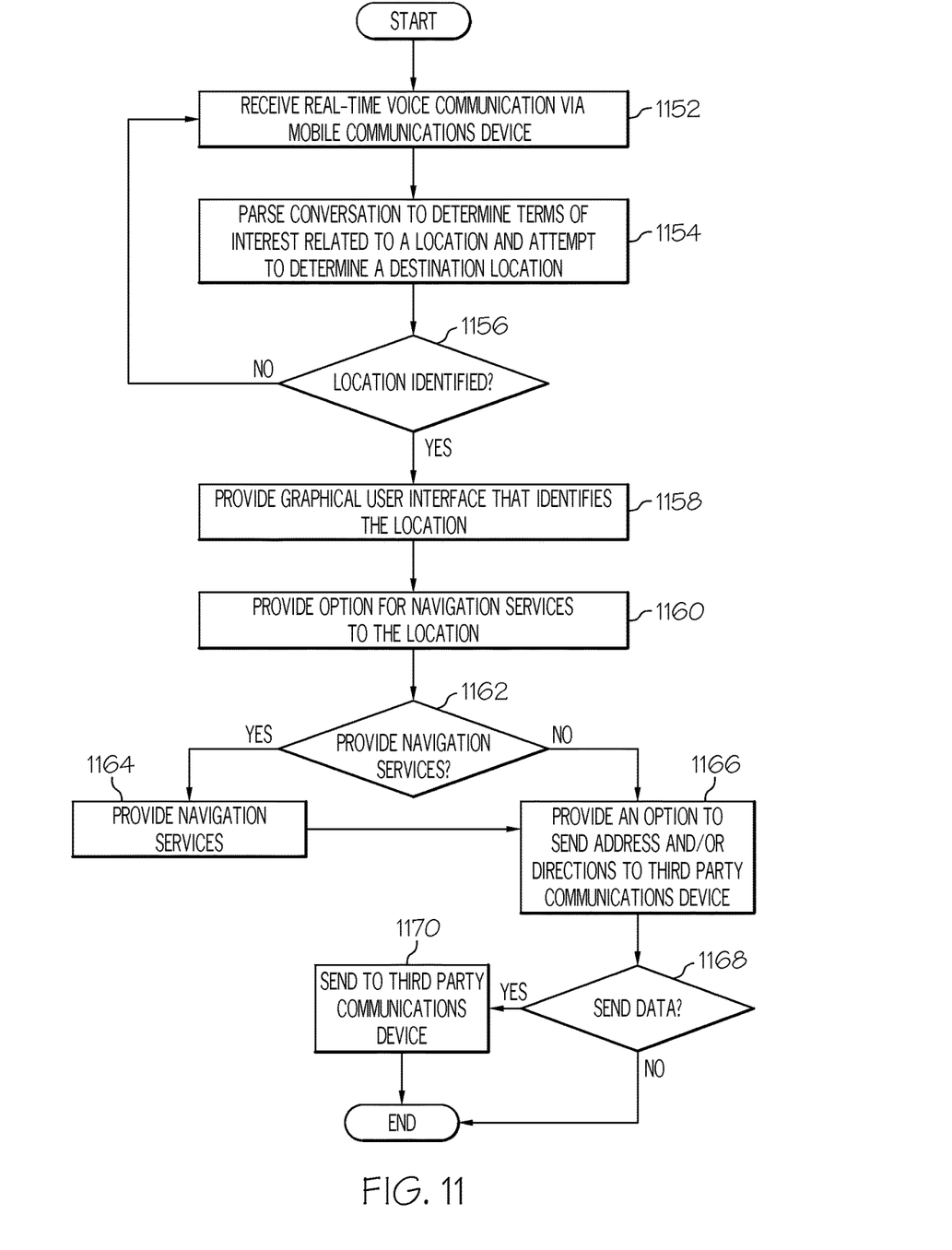
FIG. 11 depicts a flow diagram of a process for providing navigation services from real-time data received in a communication, which may be utilized in a method for determining a location from a communication, according to embodiments disclosed herein.

FIG. 11 depicts a process for providing navigation services from real-time data received in a communication, which may be utilized in a method for determining a destination location from a communication, according to embodiments disclosed herein. As illustrated, the location identification and navigation system 102*a* can receive real time communication data from a communication between the mobile communications device 108 and a third party communications device (block 1152). The location identification and navigation system 102*a* can create an electronic transcript and then parse the electronic transcript to determine terms of interest related to a destination location and attempt to identify a destination location (block 1154). A determination can then be made regarding whether a destination location was identified by the location and identification and navigation system 102*a* (block 1156). If not, the process can return to block 1152 and the location identification and navigation system 102*a* can continue to receive real-time communications. If on the other hand, the destination location has been determined, the location identification and navigation system 102*a* can provide a graphical user interface that identifies the destination location (block 1158). The location identification and navigation system 102*a* can additionally provide an option for navigation services to the destination location (block 1160). A determination can be made regarding whether the option was selected and thus whether to provide the navigation services (block 1162). If so, the navigation services can be provided (block 1164). If not, the location identification and navigation system can provide an option to send an address and/or directions to the third party communications device 108 (block 1166). A determination can be made regarding whether the option was selected and thus, whether to send the data to the third party communications device (block 1168). If not, the process can end. If the data is to be sent, the location identification and navigation system 102*a* can send an address and/or directions to the third party communications device 108 (block 1170).

It should now be understood that embodiments described herein provide systems and methods for determining a destination location for a vehicle. More specifically, embodiments may be configured to parse an electronic communication for terms of interest. Additionally, some embodiments are configured to determine, from the terms of interest, a destination location. The destination location may then be utilized to provide navigation services to the vehicle. Further, some embodiments may be configured send data related to the destination location to a third party.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method for determining a destination location from a communication, comprising steps of:
   receiving electronic communications data from a mobile communications device, at a computing device of a vehicle;
   parsing the electronic communications data to identify a first term of interest related to the destination location in the electronic communications data;
   parsing the electronic communications data to identify a second term of interest, the second term of interest identifying personal user information of a user of the vehicle;
   identifying the destination location, from the first term of interest and the second term of interest;
   providing a first user option in an interface that provides the electronic communications data to identify a third term of interest in the electronic communications data, wherein the third term of interest further identifies the destination location;
   providing a second user option in the interface that, upon user selection, removes a selected one of the terms of interest from identifying the destination location;
   in response to selection of the first user option or the second user option, updating the identified destination location;
   determining routing data of a vehicle from a current location of the vehicle to the destination location; and
   providing the routing data to a user of the vehicle.

2. The method of claim 1, wherein identifying the destination location includes determining a plurality of possible destination locations and providing a user option to select from the plurality of possible destination locations.

3. The method of claim 1, further comprising receiving an electronic transcript of a textual communication in response to selection of an option on the mobile communications device.

4. The method of claim 1, further comprising receiving the electronic communications data in real-time.

5. The method of claim 1, wherein the first term of interest does not include a portion of a street address.

6. The method of claim 1, further comprising providing a user interface to view the electronic communications data.

7. The method of claim 1, wherein the user personal information includes an address of the user.

8. A system for determining a destination location from a communication, comprising:
   a memory component that stores location identification logic that is configured to cause the system to perform at least the following:
   determine personal user information about a user of the vehicle;
   receive an electronic transcript of the communication from a mobile communications device;
   parse the electronic transcript to identify a first non-address term of interest related to the destination location in the electronic transcript;
   parse the electronic transcript to identify a second non-address term of interest, the second non-address term of interest relating to the personal user information;
   identify the destination location from at least one of the first non-address term of interest or the second non-address term of interest;
   provide a first user option in an interface that provides the electronic transcript to identify a third term of interest in the electronic communications data, wherein the third term of interest further identifies the destination location;
   provide a second user option in the interface that, upon user selection, removes a selected one of the terms of interest from identifying the destination location;
   in response to selection of the first user option or the second user option, update the identified destination location;
   determine a position of the destination; destination location;
   determine routing data for a vehicle from a current location to the destination location; and
   provide the routing data to a user of the vehicle.

9. The system of claim 8, wherein determining the position of the destination location includes determining a plurality of possible destination locations and providing a user option to select from the plurality of possible destination locations.

10. The system of claim 8, wherein the location identification logic is further configured to receive the electronic transcript in response to selection of a user option on the mobile communications device.

11. The system of claim 8, wherein the location identification logic is further configured to receive the electronic transcript in real-time.

12. The system of claim 8, wherein the location identification logic is further configured to provide a user interface to view the electronic transcript.

13. The system of claim 8, wherein the location identification logic is further configured to provide a user option to select a third non-address term of interest from the electronic transcript, wherein the third non-address term of interest is utilized in determining the destination location.

14. The system of claim 8, wherein the user personal information includes an address of the user.

15. A non-transitory computer-readable medium for determining a destination location from a communication, the non-transitory computer-readable medium storing a program that, when executed by a computer, causes the computer to perform at least the following:
   receive electronic communications data from a mobile communications device;
   parse the electronic communications data to identify a first term of interest related to the destination location in the electronic communications data;
   identify the destination location from the first non-address term of interest;
   provide a first user option in an interface that provides the electronic communications data to identify a second term of interest in the electronic communications data, wherein the second term of interest further identifies the destination location;
   provide a second user option in the interface that provides the electronic communications data to remove one of the terms of interest from identifying the destination location;
   in response to selection of the first user option or the second user option, update the identified destination location;
   determine a position of the destination location;

determine routing data from a current location to the destination location; and provide the routing data to a user of a vehicle.

16. The non-transitory computer-readable medium of claim 15, wherein determining the position of the destination location includes determining a plurality of possible destination locations and providing a user option to select from the plurality of possible destination locations.

17. The non-transitory computer-readable medium of claim 15, wherein receiving electronic communications data includes receiving an electronic transcript of a textual communication in response to selection of a user option on the mobile communications device.

18. The non-transitory computer-readable medium of claim 15, wherein the program is further executed to cause the computer to receive the electronic communications data in real-time.

19. The non-transitory computer-readable medium of claim 15, wherein the first partial address term of interest does not include a portion of a street address.

20. The non-transitory computer-readable medium of claim 15, wherein the program is further executed to cause the computer to provide a user interface to view the electronic communications data.

* * * * *

UNITED STATES PATENT AND TRADEMARK OFFICE
CERTIFICATE OF CORRECTION

PATENT NO. : 10,900,799 B2
APPLICATION NO. : 12/902406
DATED : January 26, 2021
INVENTOR(S) : Eric Randell Schmidt and Jeffrey Edward Pierfelice It is certified that error appears in the above-identified patent and that said Letters Patent is hereby corrected as shown below:

In the Specification

In Column 9, Line(s) 35, after "received", delete "form" and insert --from--, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*